United States Patent
Yamamoto

(10) Patent No.: US 10,455,771 B2
(45) Date of Patent: Oct. 29, 2019

(54) PLANT GROWTH ACCELERATION SYSTEM

(71) Applicant: eAgritech, Inc., Tokyo (JP)

(72) Inventor: Kazunori Yamamoto, Tokyo (JP)

(73) Assignee: eAgritech, Inc., Tokyo (JP)

( * ) Notice: Subject to any disclaimer, the term of this patent is extended or adjusted under 35 U.S.C. 154(b) by 0 days.

(21) Appl. No.: 16/099,191

(22) PCT Filed: Mar. 23, 2017

(86) PCT No.: PCT/JP2017/011687
§ 371 (c)(1),
(2) Date: Nov. 6, 2018

(87) PCT Pub. No.: WO2018/173186
PCT Pub. Date: Sep. 27, 2018

(65) Prior Publication Data
US 2019/0191633 A1  Jun. 27, 2019

(51) Int. Cl.
*A01G 7/04* (2006.01)
*H02M 7/06* (2006.01)
*H02M 1/32* (2007.01)

(52) U.S. Cl.
CPC ............... *A01G 7/04* (2013.01); *H02M 7/06* (2013.01); *H02M 1/32* (2013.01)

(58) Field of Classification Search
CPC .. A01G 7/04; A01G 7/06; A01G 9/26; H02M 7/06; H02M 1/32
See application file for complete search history.

(56) References Cited

U.S. PATENT DOCUMENTS 4,633,611 A * 1/1987 Schiller .................... A01C 1/08
250/433
5,117,579 A * 6/1992 Tellefson ............... A01C 21/00
422/904

(Continued)

FOREIGN PATENT DOCUMENTS

JP  63-098319      4/1988
JP  02-057349 U1  4/1990

(Continued)

OTHER PUBLICATIONS

International Search Report for corresponding International Application No. PCT/JP2017/011687, dated Jun. 6, 2017.

(Continued)

*Primary Examiner* — Kathleen I Alker
(74) *Attorney, Agent, or Firm* — Mori & Ward, LLP

(57) ABSTRACT

[Problem] Providing a plant growth acceleration system, which is safe to workers and also can be applied to even the case of a wide plant growth area.
[Solution] The plant growth acceleration system, which can effectively accelerate plant growth in a wide plant growth area by radiating electrons to the plant growth area from linearly long extended electron radiation parts or a plurality of electron radiation parts installed distributedly. Moreover, if DC power generated by a solar power generation apparatus is converted to AC power by an inverter circuit and electrons are generated, introduction of the plant growth acceleration system becomes easy and favorable even for a wide plant growth area far from a supply base of commercial power. Furthermore, if regulation of an amount of electron radiation is enabled for optimization by utilizing past growth results corresponding to external environment of a plant growth area and kinds of plant, etc., improvement of yield of plant and quality can be realized more effectively.

20 Claims, 6 Drawing Sheets

(56) References Cited

U.S. PATENT DOCUMENTS

| | | | | |
|---|---|---|---|---|
| 5,740,627 A | * | 4/1998 | Levengood | A01C 1/00 47/1.3 |
| 2011/0096454 A1 | | 4/2011 | Corsi et al. | |
| 2016/0172101 A1 | * | 6/2016 | Schmidt | A61N 2/02 600/14 |
| 2018/0116131 A1 | * | 5/2018 | Leo | A01G 22/00 |
| 2018/0235155 A1 | * | 8/2018 | Funamori | A01G 7/04 |

FOREIGN PATENT DOCUMENTS

| | | |
|---|---|---|
| JP | 2002-017164 | 1/2002 |
| JP | 2005-058033 | 3/2005 |
| JP | 2006-101771 | 4/2006 |
| JP | 2012-000054 | 1/2012 |
| JP | 3197210 U | 4/2015 |
| WO | WO 2015/121895 | 6/2015 |

OTHER PUBLICATIONS

Written Opinion for corresponding International Application No. PCT/JP2017/011687, dated Jun. 6, 2017.

* cited by examiner

PLANT GROWTH ACCELERATION SYSTEM

TECHNICAL FIELD

The present invention relates to a plant growth acceleration system, which is safe for workers and can be applied even in the case of a wide plant growth area. Specifically, the invention relates to the plant growth acceleration system, which increases the amount of yield and improves quality of plants by radiating electrons to a plant growth area. More in detail, the invention relates to the plant growth acceleration system, which can be applied without drawing on commercial power supply and also is able to regulate the amount of electron radiation by utilizing past growth results according to kinds of plant and environment of plant growth such as soil types, seasons, air temperature and hours of sunlight.

BACKGROUND ART

There is an old adage, "rice harvest is good in a year with lots of thunder". It is said to be caused by the fact that thunder produces nitrogen oxide in the air. Previously, several technologies have been disclosed to apply electrical treatment to plants in order to accelerate plant growth.

In Patent Literature 1, technology is disclosed, which accelerates growth of mushrooms by giving spark discharge to the mushroom cultivation body that was cultivated from mushroom mycelium. Since the technology generating spark discharge as in Patent Literature 1 causes risks to workers with the spark discharge, not only the target plants are limited but also the growth environment is restricted, and an issue arose that the technology cannot be applied to a wide growth area.

In Patent Literature 2, coping with an issue to prevent occurrence of replant failures, technology is disclosed, which prevents replant failures by energizing between positive and negative electric terminals by burying the two electric terminals in both sides of cultivation soil. According to the technology mentioned in the Patent Literature 2, applying a weak DC current between the two electric terminals decomposes and ionizes inorganic salts that exist in soil and inhibit plant growth, but the inorganic salts ionized to positive ions and negative ions are accumulated in the vicinity of the each electric terminal. And, the accumulated inorganic salts are to be removed respectively.

The technology mentioned in the Patent Literature 2 is the technology, which applies a DC current between the positive terminal and the negative terminal in the cultivation soil, and thus the effect of applying a DC current is limited to a narrow area between the positive and negative terminals. Furthermore, if one-directional DC current was applied between two electric terminals for several months, the terminals corroded due to electric corrosion that is a kind of electrolysis, and it would be probable that replacement of the electric terminals becomes necessary. Therefore, an issue exists that it is difficult to continuously apply to a wide plant growth area.

In Patent Literature 3, technology is disclosed, in which pots are electrically insulated from the ground by insulation sheets, one electric terminals are buried in the vicinity of plants planted in the pots, the other electric terminals are buried in the ground close to the pots, and high voltage is applied to the plants from the electric terminals buried in the pots. According to the technology in the Patent Literature 3, electric current is applied indeterminately either a DC current or an AC current. However, in the case of a high-voltage AC current, ozone emits from the positive electric terminals, which is hazardous to instruments or plants, thus an issue exists that the plants in the pots cannot be raised.

In Patent Literature 4, technology is disclosed, which accelerates plant growth by irradiating minus ions towards plants cultivated in a seedbed, etc. The technology mentioned in the Patent Literature 4 adopts needle electric terminals for negative electric terminals and conductive resin with plural openings for positive electric terminals, and projects an extremely weak corona discharge from the negative electric terminals towards the positive electric terminals. With this, a large amount of minus ions can be produced without emitting ozone that is hazardous to instruments and inhibit plant growth.

However, the technology mentioned in the Patent Literature 4 needs to have an apparatus that can change the distance between the plants and the minus-ion modules that produce minus ions. Since it is difficult to arrange minus-ion modules so as to cover a wide plant growth area entirely, there is an issue that the technology cannot be applied to a wide plant growth area.

In Patent Literature 5, the technology to accelerate growth of plants planted in the soil of planters electrically insulated from the ground is disclosed. The technology mentioned in the Patent Literature 5 applies negative DC voltage to the plants by burying negative electric terminals in the soil of the planters so that the negative DC voltage applied by the negative electric terminals does not spread to the ground. With this, it is claimed that the negative DC voltage can be applied intensively to the plants.

In the technology mentioned in the Patent Literature 5, AC voltage is boosted and converted to DC voltage by a rectifier circuit. When converted to the DC voltage, a sine-wave waveform of the AC voltage is leveled and the boosted AC voltage is smoothened. Therefore, in order to gain certain high DC voltage after rectification, it is necessary to boost the high voltage before rectification to higher voltage than the voltage after rectification. There is an issue that the technology is inefficient and difficult to apply to a wide plant growth area, since a power loss occurs at the rectification.

In Patent Literature 6, the technology is disclosed, which improves soil environment by radiating electrons produced by an electron generation device to the soil. According to the technology mentioned in the Patent Literature 6, it is claimed that radiating electrons to the soil decreases colon bacilli, etc. that inhibit plant growth, as well as increases aerobic bacteria that accelerate plant growth.

However, it is difficult to exert the effect of electrons efficiently to a wide-range plant growth area by the bar-shaped electron-radiating parts mentioned in the Patent Literature 6, and providing a technology of plant growth acceleration system, which can radiate electrons efficiently to a wide range, was a problem.

CITATION LIST

Patent Literature

Patent Literature 1: Japanese Unexamined Patent Application No. 2012-00054

Patent Literature 2: Japanese Unexamined Utility Model Application No. Hei 02-57349

Patent Literature 3: Japanese Unexamined Patent Application No. 2006-101771

Patent Literature 4: Japanese Unexamined Patent Application No. 2005-58033

Patent Literature 5: Japanese Unexamined Patent Application No. 2002-17164
Patent Literature 6: Japanese Utility Model Registration No. 3197210

DISCLOSURE OF INVENTION

Problem to be Solved by the Invention

Therefore, the inventor of the present invention set a goal that provides a plant growth acceleration system, which can be applied to a case of wide plant growth area and is safe for workers as well. Specifically, the goal is providing the plant growth acceleration system, which can improve an amount of yield and quality by radiating electrons effectively to the plant growth area, can be operated even without installing commercial power supply, and also can regulate the amount of electron radiation by utilizing the past growth results depending on kinds of plant, soil types, seasons, air temperature and hours of sunlight.

Means for Solving Problem

A plant growth acceleration system of the first invention according to the present invention is comprising an electron generation means that produces electrons and an electron radiation means that radiates electrons to a plant growth area, and is characterized as follows: the plant growth area is electrically grounded; the electron generation means is equipped with a transformer that transforms AC power inputted on a primary circuit to high voltage and outputs from a secondary circuit; the first terminal of the secondary circuit is connected to the primary circuit together with the second terminal of the secondary circuit being connected to the electron radiation means; according to plus/minus inversion cycles of the AC power, when the first terminal is in positive potential, an electric current from the second terminal to the electron radiation means is blocked, and when the first terminal is in negative potential, an electric current returns from the first terminal to the primary circuit, thus only when the first terminal is in negative potential, according to the inversion cycle, the electrons are cyclically transmitted from the second terminal to the electron radiation means; the electron radiation means includes electron transmission parts with electron radiation parts grounded to the plant growth area; the electron transmission parts are linearly long extended, and the electron radiation parts are linearly long extended and grounded to the plant growth area; thus the plant growth is accelerated by radiating only the electrons along the electron radiation parts.

The state that a plant growth area is electrically grounded is not limited to a case that the plant growth area is united with the ground, but also includes a case that soil in planters insulated from the ground is connected through conductive wire to the ground. Type and size of the plant growth area is not restricted, but can be for example a farm, a paddy field, pasture, or even planters in a plant factory.

The electron generation means returns a current from the first terminal to the primary circuit by connecting the first terminal of the secondary circuit to the primary circuit in the transformation circuit, and produces electrons on the second terminal of the secondary circuit and supplies to the electron radiation means, only when the first terminal is in negative potential. And according to inversion cycles of the AC power, only when the first terminal is in negative potential, electrons are radiated in unrestricted directions from the linearly extended electron radiation parts to the surrounding plant growth area. The electron generation means itself is enough to just accommodate the transformation circuit, thus will not be large equipment, and then can be easily transferred.

Since the current flowing into the electron radiation means is blocked at the timing of the first terminal being in positive potential, even if high voltage develops on the secondary circuit, ozone is not produced on the electron radiation parts connected to the secondary circuit. And, since the first terminal itself is connected to the primary circuit, ozone is not produced on the first terminal either. From either side of the first terminal or the second terminal, ozone is not produced, which is hazardous to equipment and inhibit plant growth. With this, electrons can be radiated for a long period of time in a wide plant growth area. Specific structure of transformation circuit will be explained in an example described later.

Although the voltage value and current value of the AC power generated at the secondary side is not restricted, but high voltage and low current are preferable. For example, if a commercial power source is boosted to 50 times the voltage by a transformer, the current value becomes $1/50$. The electric energy consumed at the electron transmission parts will be lowered to $1/2500$ with the current value being $1/50$, thus the electrons can be transmitted effectively. Moreover, workers can work safely with the lowered current value at the side of the electron transmission parts by connecting large current controlling resistance between the second terminal and the electron transmission parts.

For instance, since the minimum value of sensible current that human body can sense is known more than 1 mA, it is preferable setting the current value at the electron transmission parts to a small value of less than 1 mA that is the level human body cannot sense. Furthermore, the voltage value at the electron radiation parts is preferable to be the similar value of static electricity appeared in general living environment, such as approximately 3000 to 5000V. In the electric condition within these current and voltage, workers can work safely without sensing any current flow or pain in a static-electricity level, as long as the workers do not touch directly the electron radiation parts while working.

Moreover, by controlling the amount of electron radiation to small enough within the range, where the plant growth acceleration is assured, the electrons can be generated by small electric energy, thus the advantageous effect can be gained that economical growth acceleration is realized in a safe condition for workers, even in a case of wide plant growth area.

The power source is not limited to commercial power supply, but also AC power transformed from a direct current can be used as the source. Specifically, by using power transformation means called an inverter circuit that transforms a DC current to an AC current, a DC current gained from natural energy, such as sunlight or wind power, or a DC current from electrical storage device are transformed to an AC current and can be used as the power source. Adopting a power generation apparatus using natural energy, such as solar power, is preferable, since the introduction of plant growth acceleration system becomes easy even for a wide plant growth area far located from a supply base of commercial power. Furthermore, a solar power generation apparatus, etc. can be used together with an electrical storage device. Since sunlight is necessary for plant growth, a solar power generation apparatus is preferable among power generation apparatuses utilizing natural energy, but not restricted.

The state that the electron transmission parts are extended linearly is not restricted to the case being arranged in extending straight lines. For example, the electron transmission parts can be divided, or arranged in a loop or in rows. The length of the electron transmission parts is not restricted and can be selected according to the size of a plant growth area. If the length of the electron transmission parts is set to 3 m, wiring of the electron transmission parts is difficult to be tangled in a small-scale plant growth area such as a kitchen garden. On the other hand, in the case of a large-scale plant growth area, the length shall be determined according to the growth area, and a plurality of the electron transmission parts can be connected. Moreover, the electron transmission parts are made separable from the electron generation means, and if single electron generation means is designed to connect or disconnect in turn to plural electron transmission parts of different places, electrons can be radiated for a certain period of time to the plural places.

The electron radiation parts are extended long linearly and grounded continuously to the plant growth area, thus radiate electrons effectively in a wide area surrounding the electron radiation parts along the electron radiation parts. Differently from conventional arts that flow electricity from cathodes to anodes, electrons are radiated from the electron radiation parts to the surrounding area. The electron radiation parts can be grounded appropriately according to the planting layout for cultivation, for example according to the spaces of furrows. If one part of the electron transmission parts is not made to the electron radiation parts and exposed above the ground as a mark, it becomes easy to work without catching inadvertently the electron radiation parts.

The grounding depth of the electron radiation parts is not restricted, but can be buried to the depth so as not to interfere with the roots of plants, etc. It also may be enough to place the electron radiation parts so as to touch the surface of the plant growth area. It is good enough to ground for the ease of cultivation work as well as to suit the planting layout. Although the material of the electron radiation parts is not restricted, but if the wire made of stainless steel is employed, it does not corrode, and can be used repeatedly for a long period of time and preferable by storing reeled wire during off-season of cultivation work.

According to the first invention of the present invention, the favorable effect is realized that even in the case of a wide plant growth area, by effectively radiating electrons and exerting effect of the electrons to the plants in the plant growth area, plant growth can be accelerated. And, if the electrons are generated with small electric energy, it becomes possible for the electrons to be continuously radiated to the soil safely and economically.

A plant growth acceleration system of the second invention according to the present invention is comprising an electron generation means that produces electrons and an electron radiation means that radiates electrons to a plant growth area, and is characterized as follows: the plant growth area is electrically grounded; the electron generation means is equipped with a transformer that transforms AC power inputted on a primary circuit to high voltage and outputs from a secondary circuit; the first terminal of the secondary circuit is connected to the primary circuit together with the second terminal of the secondary circuit being connected to the electron radiation means; according to plus/minus inversion cycles of the AC power, when the first terminal is in positive potential, an electric current from the second terminal to the electron radiation means is blocked, and when the first terminal is in negative potential, an electric current returns from the first terminal to the primary circuit, thus only when the first terminal is in negative potential, according to the inversion cycle, the electrons are cyclically transmitted from the second terminal to the electron radiation means; the electron radiation means includes electron transmission parts with electron radiation parts grounded to the plant growth area; the electron transmission parts are linearly long extended and the electron radiation parts are distributedly placed to plural places and grounded to the plant growth area; thus the plant growth is accelerated by radiating only the electrons from the electron radiation parts.

In the second invention, the electron transmission parts are extended long, the electrons radiation parts are distributedly attached to plural places of the electron transmission parts and grounded, and the electrons are radiated from the respective electron radiation part. Since the electron radiation parts are distributed, the electrons are radiated in a wide area from the each electron radiation part, thus it becomes easy to radiate the electrons evenly to a wide plant growth area. Moreover, if a bar is attached to the each electron radiation part, the plant growth acceleration system can be easily introduced by only inserting the bars, even in the case to newly introduce a plant growth acceleration system to a plant growth area with plants being already planted or to planters distributed in a plant-cultivation factory.

Again, since the electron radiation parts are attached to the distributed places of the electron transmission parts being extended long linearly, changing spaces to place the electron radiation parts by slacking the electron transmission parts is possible. The shapes of the electron radiation parts can be selected appropriately according to the soil property of plant growth area or planting layout, such as axial shapes, board shapes or the electron transmission parts with the covering being exposed. According to the second invention, the favorable effect is realized that grounding the electron radiation parts in a suitable condition to the layout of plant cultivation, etc. is easy.

The third invention according to the present invention is the plant growth acceleration system of the first or the second invention, and characterized as follows: the electron transmission parts are dividable in the extending direction; connection or disconnection devices are equipped on each divided electron transmission part; the connection devices enable to connect each of the divided electron transmission parts so that the electrons are transmitted; and the disconnection devices enable to disconnect each of the divided electron transmission parts, when the disconnecting operation is carried out.

Here, the extending direction is not limited to a continuously extending direction in a line, but includes extending directions after branching at the division points. If depicting an example of the connection devices, the connection devices can be: an end point of conductive wire configuring one side of the electron transmission part at the connection point is equipped with a male plug; an end point of conductive wire configuring the other side of the electron transmission part is equipped with a female socket; thus the both end points can be connected so that electrons are transmitted. As the disconnection devices, male spiral grooves formed on a circumferential surface of end portions of the male plug and the female socket, and female spiral grooves formed on an inner surface of cylindrical body are sufficient.

The connection state is made by the female spiral grooves of the cylindrical body being engaged to the male spiral grooves on the circumferential surface of the end portions of the male plug and the female socket, and when operation to release the engagement by axially moving the cylindrical body, the connection is released. The connection devices are preferable, since both of connection and disconnection are easy. Again, both of connection devices and disconnection devices are not limited to the example, but needless to say that attaching boards with a hole to the connecting portions of the electron transmission parts can be sufficient, in which connection is made by tightening overlapped boards with a bolt and a nut through the hole, and for disconnection, connection is released by removing the bolt from the nut.

In the case of a narrow plant growth area like a kitchen garden, disengaging the connecting portions can shorten the length of the electron transmission parts in order to make the excess length of the electron transmission parts not obstructive. In the case of a wide plant growth area like a large-scale farm, connecting the electron transmission parts at the connecting portions can lengthen their length, and electron radiation in a wide area becomes possible. Moreover, even if workers or domestic animals moving around in the plant growth area or intruding wild animals catch the electron transmission parts with their legs, the electron transmission parts are not to be separated in the case that disconnecting operation is not being done at the disconnection devices. According to the third invention, the appropriate length of electron transmission parts can be arranged according to the width of plant growth area, and also the electron transmission parts are difficult to be separated, thus the function of the plant growth acceleration system is difficult to be hindered.

The fourth invention according to the present invention is the plant growth acceleration system from the first to the third invention, and characterized that the electron transmission parts are branched to a plurality and the branched electron transmission parts are arranged in parallel to each other. For instance, in the case that plants are cultivated on plural furrows, if the electron transmission parts are grounded in parallel to each furrow along the extending direction of the furrows, electrons can be radiated effectively along the furrows. By grounding the electron transmission parts in parallel, even in a wide plant growth area, electrons are radiated effectively to the whole plant growth area.

The fifth invention according to the present invention is the plant growth acceleration system of the fourth invention, and characterized that the second electron transmission parts extend linearly so as to intercross the branched electron transmission parts and the branched electron transmission parts are in electrically connected state with the second electron transmission parts. The branched electron transmission parts are electrically connected with the second electron transmission parts of a linear shape, thus the electron transmission parts enclose the plant growth area. In the case of a vast plant growth area like pasture, two directional electron transmission parts are intercrossed to form a net shape, thus it becomes possible to exert effects of electrons to the whole plant growth area. According to the fifth invention, even if a plant growth area is vast, it is easy to radiate electrons evenly and entirely.

The sixth invention according to the present invention is the plant growth acceleration system from the first to the fifth invention, and characterized that a plurality of the electron generation means are included and connected respectively to remote locations of the electron transmission parts. Since a plurality of the electron generation means are connected to remote locations of the electron transmission parts, the electron radiation parts located in the middle can alleviate effect of attenuation by electrons being transmitted from both sides, thus necessary amount of electrons can be radiated. According to the sixth invention, the plant growth acceleration system adapted to large-scale farming can be realized.

The seventh invention according to the present invention is the plant growth acceleration system from the first to the sixth invention, and characterized as follows: a solar power generation apparatus and a power conversion means are included; DC power is generated by the solar power generation apparatus; the DC power is converted to AC power by the power conversion means; and the AC power is supplied to the primary circuit.

DC power generated by the solar power generation apparatus is converted to AC power by an inverter circuit and supplied to the primary circuit of the electron generation means. By adopting electric power generated by the solar power generation apparatus as sole power supply, a plant growth acceleration system can be introduced without drawing on commercial power supply even in the case of a remote area far from a supply base of the commercial power.

A plant growth acceleration system of the eighth invention according to the present invention is comprising an electron generation means that produces electrons, an electron radiation means that radiates electrons to a plant growth area, a solar power generation apparatus, and a power conversion means, and is characterized as follows: the plant growth area is electrically grounded; the electron generation means is equipped with a transformer that transforms AC power inputted on a primary circuit to high voltage and outputs from a secondary circuit; the first terminal of the secondary circuit is connected to the primary circuit together with the second terminal of the secondary circuit being connected to the electron radiation means; according to plus/minus inversion cycles of the AC power, when the first terminal is in positive potential, an electric current from the second terminal to the electron radiation means is blocked, and when the first terminal is in negative potential, an electric current returns from the first terminal to the primary circuit, thus only when the first terminal is in negative potential, according to the inversion cycle, the electrons are cyclically transmitted from the second terminal to the electron radiation means; the solar power generation apparatus generates DC power, and only AC power converted from the DC power by the power conversion means is used as the AC power; the electron radiation means includes electron radiation parts grounded to the plant growth area, and the outer edge of the electron radiation parts forms a ring shape; thus the electrons are radiated in a ring shape around the places where the electron radiation parts are grounded, and the plant growth is accelerated.

Since the plant growth acceleration system is independent from external commercial power supply and does not necessitate conductive wire to draw on AC power from outside, it becomes possible to accelerate plant growth by running large farming machines around the plant growth acceleration system while the electron radiation parts are fixed. In the case of vast plant growth area, a plurality of independent plant growth acceleration systems can be installed distributedly. The state that the outer edge of the electron radiation parts forms a ring shape means either adopting a disc, the periphery of which is the electron radiation parts, or arranging the linear electron radiation parts in a ring shape.

The ninth invention according to the present invention is the plant growth acceleration system from the first to the eighth invention, and is characterized as follows: the plant growth acceleration system includes soil condition detection means, memory means, and electron radiation regulation means; the soil condition detection means detects the value of soil condition of at least either EC value of the plant growth area or soil temperature; the memory means stores the value of the soil condition and the amount of radiated electrons, and also pre-store the range of presumed value of soil condition suitable to the cultivating plant; and the amount of electrons radiated from the electron radiation parts can be regulated by the electron radiation regulation means so that the value of the soil condition falls within the range of the presumed value of soil condition.

The soil condition detection means is sufficient to detect at least one of EC value or soil temperature. In the memory means, the range of presumed value of soil condition suitable to the cultivating plant is pre-stored, and by comparing the detected value of soil condition with the presumed value of soil condition, when the detected value of soil condition is out of the range of presumed value of soil condition, the amount of electron radiation can be regulated by evaluating the stored amount of electron radiation so as to fall within the appropriate value.

For plant cultivation, long period of cultivating time is necessary, and also evaluating cultivation records over the long period is necessary depending on kinds of plant and soil type, etc. According to the ninth invention, by grasping appropriate amount of electron radiation from the relation of the recorded-and-stored amount of electron radiation over the long period of time and the value of soil condition depending on kinds of plant and soil type, the amount of electron radiation can be regulated. With the value of soil condition being kept within the range of presumed value of soil condition for the period of a good harvest, the plant growth acceleration system to further improve the amount of yield or quality can be realized.

EC value is the value that represents electrical conductivity in soil and has close association with nitrate nitrogen concentration contained in the soil. Since nitrate nitrogen concentration is hard to be measured, growth control such as adding fertilizer is carried out by detecting EC value that can be detected easily. When electrons are radiated to a plant growth area, nitrate nitrogen concentration is verified to increase by the effect of the electrons. With regulating the amount of electron radiation so that the soil condition falls within the range of appropriate EC value to suit the kind of plant, the optimum environment to cultivate plants is realized together with sparing the amount of nitrogen fertilizer.

Furthermore, electron radiation is verified to increase soil temperature. Although the cause is uncertain, the number of aerobic bacteria living inside the soil increases, and it is supposed that soil temperature increases as a result of accelerating fermentation of fertilizer contained in the soil. Although higher soil temperature is generally favorable to plant growth, it is presumed that there is the appropriate range in soil temperature similarly as in EC value depending on the kind of plant. Therefore, increase of yield amount and improvement of quality are to be achieved by detecting soil temperature and radiating electrons so as to keep the temperature within the range suitable to the growth of cultivating plant.

Moreover, growth of farm products is influenced by various environmental conditions such as water content in soil, soil property, seasons of plant cultivation, hours of sunlight, outside temperature, humidity, or precipitation. Therefore, even in the same region and the same kind of plant, when environmental condition is different, the difference in suitable EC value and soil temperature occurs. Then, in order to reproduce the amount of electron radiation for the period of good harvest, regulation to optimize the amount of electron radiation is made possible by storing the detected value of soil condition corresponding to the amount of radiated electrons in the memory means. With this, the effect of plant growth acceleration by electrons is further enhanced, and increase of yield amount and improvement of quality are to be achieved.

Effect of the Invention

According to the first invention, even in the case of wide plant growth area, a favorable effect is realized that the plant growth is accelerated by radiating electrons effectively and exerting the effect of electrons to the plants in the plant cultivation area. Moreover, if electrons are generated by small electric power, safe and economic continuous electron radiation to the soil becomes possible.

According to the second invention, a favorable effect is realized that grounding the electron radiation parts in the appropriate state to the layout of plant cultivation, etc. is easy.

According to the third invention, the electron transmission parts with the appropriate length to the width of the plant growth area can be arranged, and also since the electron transmission parts are difficult to be separated, a favorable effect is realized that the function of the plant growth acceleration system is difficult to be hindered.

According to the fourth invention, by grounding the electron transmission parts being arranged in parallel to each other, it becomes possible to radiate electrons effectively to the whole plant growth area even in the case of wide plant growth area.

According to the fifth invention, it is easy to radiate electrons evenly and entirely, even if the plant growth area is vast.

According to the sixth invention, the plant growth acceleration system to suit large-scale farming can be established.

According to the seventh invention, a plant growth acceleration system can be introduced without drawing on commercial power supply, even if the place is remotely located from a supply base of the commercial power.

According to the eighth invention, it becomes possible to accelerate plant growth by using large farming machines around the plant growth acceleration system while the electron radiation parts are fixed.

According to the ninth invention, by keeping the value of soil condition within the range of presumed value of soil condition for the period of a good harvest, the plant growth acceleration system to further improve the amount of yield or quality is realized.

BEST MODE(S) FOR CARRYING OUT THE INVENTION

The inventor of the present invention invented the plant growth acceleration system that can accelerates plant growth safely and effectively even in a wide plant growth area by using an electron generation means of low energy consumption, either with radiating electrons from linearly long-extended electron radiation parts to the plant growth area or radiating electrons from distributed plural electron radiation parts to the plant growth area. Moreover, by making plant growth acceleration system independent, even while the electron radiation parts are being grounded, plant growth is enabled by running large farming machines around the electron radiation parts.

According to the verification tests, in which electrons are radiated in a wide plant growth area using an testing equipment of electron generation means consuming low electric power with the maximum consumed power limited to 1 W or 2 W, not only increase of the yield amount but also quality improvement, such as improvement of sugar content and flesh density, were confirmed. The specific structure of plant growth acceleration system is described below, together with the results of the verification tests.

Example 1

Figure 1A:
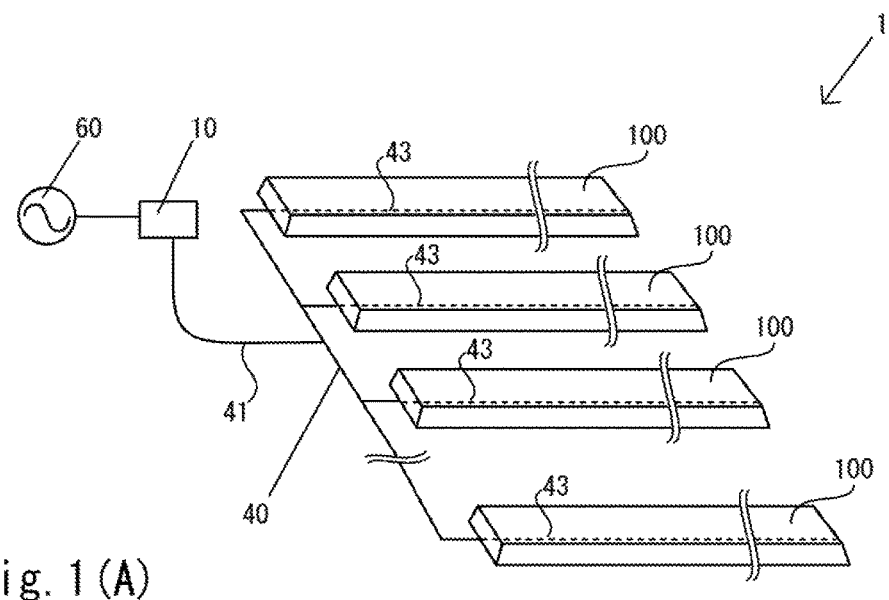
FIG. 1(A) and FIG. 1(B) are explanatory drawings to explain the plant growth acceleration system (Example 1).
Figure 1B:
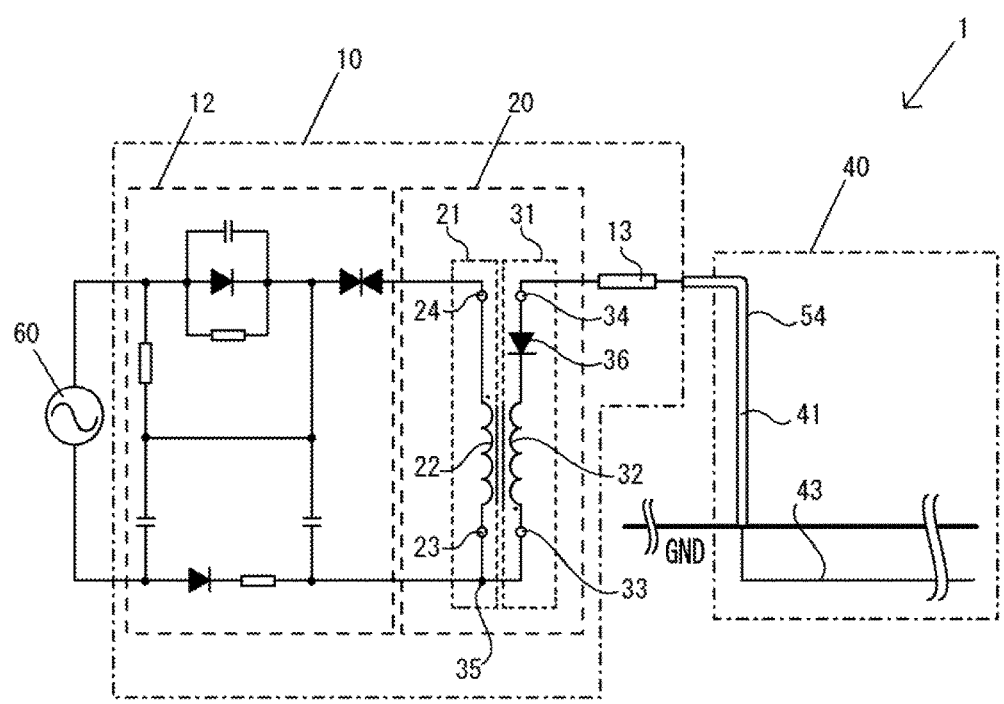

In example 1, a plant growth acceleration system 1 including linearly long-extended electron radiation parts grounded to a plant growth area will be explained referring to FIG. 1(A) and FIG. 1(B) and FIG. 2(A) and FIG. 2(B). In FIG. 1(A), the buried electron radiation parts are shown in dotted lines. In FIG. 1(B), an electron generation means and an electron radiation means are shown surrounded by dashed lines. In each drawing of FIG. 2(A) and FIG. 2(B), directions of current flow and electron flow are shown by arrows. And in FIG. 2(A), arrows of wavy lines show the state of electrons being radiated.

Figure 2A:
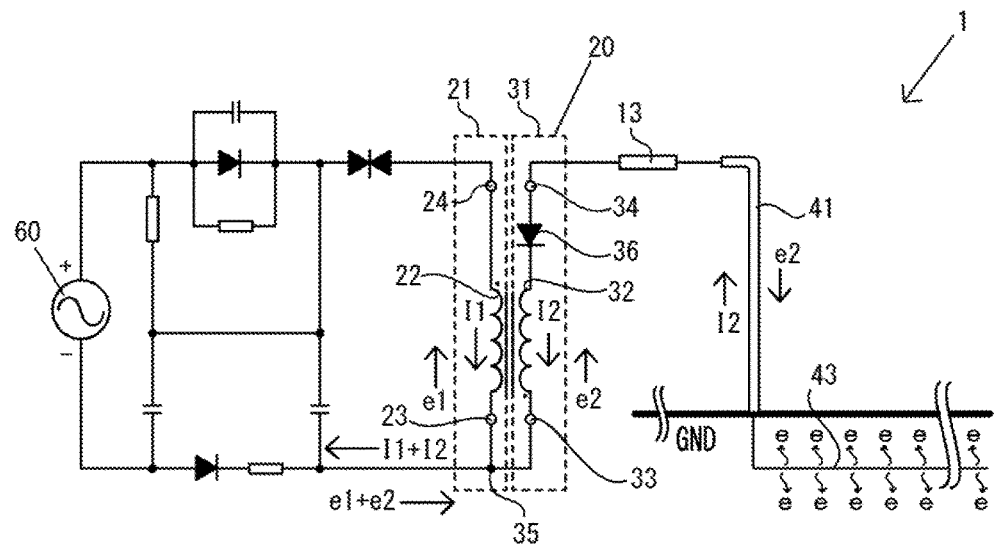
FIG. 2(A) and FIG. 2(B) are explanatory drawings to explain the electron generation means and the electron radiation means (Example 1).
Figure 2B:
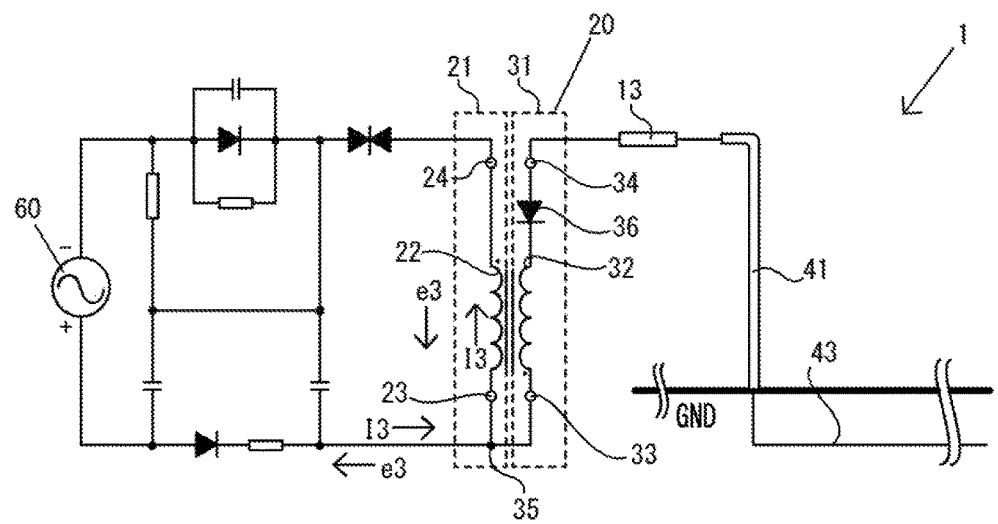

FIG. 1(A) and FIG. 1(B) are explanatory drawings to describe the plant growth acceleration system 1. FIG. 1(A) shows an example of wiring of electron radiation parts in the plant growth acceleration system 1. FIG. 1(B) is the explanatory drawing to describe the structure of the electron generation means 10 and the electron radiation means 40. FIG. 2(A) and FIG. 2(B) are the explanatory drawings to show the state of electrons being generated in the electron generation means 10. FIG. 2(A) shows the state of electrons being radiated from the electron radiation parts 43, and FIG. 2(B) shows the state of electrons not being radiated from the electron radiation parts 43.

The plant growth acceleration system 1 includes the electron generation means 10 that generates electrons, and the electron radiation means 40 that radiates electrons generated by the electron generation means to the plant growth area (refer to the dashed-lined frames in FIG. 1(B)). Power supply 60 that supplies electricity to the electron generation means is commercial AC power supply with voltage value of 100V. In the example 1, an example that applies to a plant growth area with approx. 50 m in length, approx. 20 m in width and area of approx. 1000 m2 is explained. The length of a furrow 100 is approx. 50 m and 13 furrows are arranged in parallel to each other (some parts of the furrows are omitted in FIG. 1(A)).

Referring to FIG. 1(A) and FIG. 1(B), the structure of the electron radiation means 40 is explained. The electron radiation means 40 includes electron transmission parts 41 containing the electron radiation parts 43 grounded to the plant growth area. The electron radiation parts 43 are branched to plural pieces, and each electron radiation part is grounded to the plant growth area while being buried in the total length of a furrow along the extending direction of the furrow (refer to FIG. 1(A)). The buried depth of the electron radiation parts 43 is 10-15 cm under the grooves of the furrows. The portion of the electron transmission parts 43 other than the electron radiation parts is covered with an insulation covering 54 (refer to FIG. 1(B)).

Hereunder, referring to FIG. 1(B), the structure of the electron generation means 10 is explained. The electron generation means includes a transformer circuit 20 that transforms AC power inputted to a primary circuit to high voltage and outputs from a secondary circuit. And, a protection circuit 12 that prevents damage to the equipment when excessive electric current flows (since known circuit structures suffice, the drawing shows an example of circuit structures and omits an explanation), and current controlling resistance 13 that keeps current of the electron-radiation-parts side in low current value are equipped.

The transformer circuit 20 is composed of the primary circuit 21 connected to the power supply 60 through the protection circuit 12 and the secondary circuit 31 that generates high-voltage AC power. In the primary circuit, in order from the top of FIG. 1(B), the second terminal 24 of the primary circuit, a primary coil 22, and the first terminal 23 of the primary circuit are arranged. In the secondary circuit, in order from the top of the same drawing, the second terminal 34 of the secondary circuit, a diode 36, a secondary coil 32, and the first terminal 33 of the secondary circuit are arranged. And, the first terminal 33 of the secondary circuit is connected to the primary circuit 21 at a connecting point 35, and the second terminal 34 of the secondary circuit is connected to the electron radiation means 40 through the current controlling resistance 13. Incidentally, in the case that polarity is reversed depending on a winding direction of coil wire in the transformer circuit, terms of the first terminal and the second terminal of the secondary circuit should be replaced.

The ratio of the winding number between the primary coil 22 and the secondary coil 32 is 50 times, and when an AC power is inputted to the primary circuit 21 from commercial AC power supply of 100V, a high-voltage AC power of 5000V is outputted to the secondary circuit 31. The diode 36 is connected between the secondary coil 32 and the second terminal 34 of the secondary circuit, thus electrons flow only to the direction toward the electron radiation means 40. Between the second terminal 34 of the secondary circuit and the electron radiation means 40, the current controlling resistance 13 with resistance value being 10MΩ is connected. With the connection of the current controlling resistance 13, by limiting the current value toward the electron radiation means 40 to 0.2 mA-1 mA, which is less than the minimum sensation current (approx. 1 mA) sensible by a human body, safety to workers is assured.

Next, referring to FIG. 2(A), directions of the currents and the electrons in the transformer circuit 20 are explained at the timing of the first terminal 33 of the secondary circuit being in negative potential. Here, the current that flows to the primary coil 22 is shown as I1, the electron as e1, and the current that flows to the secondary coil 32 is shown as I2, and the electron as e2. In the transformer circuit 20, when the current I1 flows from the second terminal 24 of the primary circuit to the first terminal 23 of the primary circuit (refer to the arrow I1 in FIG. 2(A)), the current I2 flows from the second terminal 34 of the secondary circuit to the first terminal 33 of the secondary circuit (refer to the arrow I2 in FIG. 2(A)).

And, with the first terminal 33 of the secondary circuit and the primary circuit 21 being connected, at the timing of the first terminal 33 being in negative potential, the current I2 generated in the secondary circuit returns to the primary circuit 21. Thus, the current I1 and the current I2 merge and flow together from the connecting point 35 of the first terminal 33 of the secondary circuit and the primary circuit 21 toward the power supply (refer to the arrow I1+I2 in FIG. 2(A)).

The direction of electron flow and current flow are defined as opposite. Then, if the aforementioned current flow is restated, the electron e1 flows from the first terminal 23 of the primary circuit to the second terminal 24 of the primary circuit (refer to the arrow e1 in FIG. 2(A)). In the secondary circuit 31, the electron e2 flows from the first terminal 33 of the secondary circuit to the second terminal 34 of the secondary circuit (refer to the arrow e2 in FIG. 2(A)).

The diode 36 provided to the secondary circuit rectifies current so that the current flows only from the second terminal 34 of the secondary circuit to the first terminal 33 of the secondary circuit. In other words, the electrons e2 are supplied to the electron radiation means 40 after flowing from the first terminal 33 to the second terminal 34 of the secondary circuit, then are radiated to the plant growth area from the electron radiation parts 43 after going through the electron transmission parts 41 (refer to the arrows e2 in FIG. 2(A)).

Referring to FIG. 2(B), directions of the current and the electrons in the transformer circuit 20 are briefly explained at the timing of the first terminal 33 of the secondary circuit being in positive potential. In FIG. 2(B), the current that flows through the primary coil 22 is shown as I3, the electron as e3. In an AC current, value of voltage and current inverts cyclically (refer to the arrow I1 in FIG. 2(A) and the arrow I3 in FIG. 2(B)), in other words, flowing direction of electrons also cyclically inverts (refer the arrow e1 in FIG. 2(A) and the arrow e3 in FIG. 2(B)). At the timing of the first terminal 33 of the secondary circuit being in positive potential, the current that flows from the first terminal 33 to the second terminal 34 in the secondary circuit is blocked by the diode 36 of the secondary circuit 31, in other words, the flow of electrons is also blocked.

With this, at only the timing of the first terminal 33 being in negative potential, according to plus/minus inversion cycles of an AC current, electrons are cyclically transmitted (refer to FIG. 2(A)) from the second terminal 34 to the electron radiation means 40 (refer to FIG. 1(B)). Furthermore, at the timing of the first terminal 33 being in positive potential (refer to FIG. 2(B)), even if high voltage occurs in the secondary circuit 31, since the current flowing toward the electron radiation means 40 is blocked, ozone will not be generated at the electron radiation parts 43.

Since the first terminal 33 itself of the secondary circuit is connected to the primary circuit 21, ozone will not be generated at the first terminal 33 of the secondary circuit either. Since ozone, which is harmful to the equipment comprising the electron generation means and also inhibits the plant growth, is not generated at either side of the first terminal or the second terminal, electron can be radiated for a long period of time in the wide plant growth area.

(Verification Test 1)

In the verification test 1, a verification test was conducted, using the electron radiation means 40 and the electron generation means 10, to accelerate growth of tomatoes of fruit vegetable category in a plant growth area of approx. 50 m in length, approx. 20 m in width and area of approx. 1000 m2, and the cases of with and without electron radiation were compared in the same planting condition of 1000 tomato plants. The detailed test condition and test results are explained as follows.

(Testing Environment)

The plant growth area of the verification test was a cultivation greenhouse situated at lat. 33.3° N., long. 131.4° E. and at an altitude of 5 m. The test period was 92 days from Oct. 1, 2016 to Dec. 31, 2016. The average temperature outside of the greenhouse during the test period was 15.1° C. (maximum temperature: 30.8° C., minimum temperature: −1.3° C.) The precipitation outside of the greenhouse during the test period was 275.5 mm (days of precipitation: 33 days). Inside of the greenhouse, the temperature was controlled by heating equipment within the range of 8-13° C. during night and 20-25° C. in daytime.

(Specification of Testing Equipment)

The power consumption of the testing equipment was 1 W, and used power supply was commercial AC power supply of 100V, 60 Hz. The voltage value of the primary AC power was 100V, and the current value was 10 mA. The ratio of winding number between the primary coil and the secondary coil was set at 50 times, and the voltage value of AC power on the secondary side became 5000V and the current value became 0.2 mA. With continuously energizing for the full testing period, total amount of used power was 1 W×24 h×92 days=2.28 kWh. When 1 kWh costs ¥20, electric charge was approx. ¥50 in total.

The length of the electron radiation parts 43 was 650 m in total using 13 pieces of 50 m-long wires. The space of each wiring was 1.5 m corresponding to the space of furrows. The type of wire was stainless steel wire of 2 mm diameter. The buried position of wire was 10-15 cm deep beneath the bottom of grooves along the total length of the furrows. Table 1 shows the amount of yield, etc. in the cases of with and without electron radiation. The data in the case of without electron radiation is based on the record of test cooperation farm for the recent 10 years. Here, the average sugar content is verified by collecting 3 pieces each at 3 locations (east end, center, west end) of different sunlight condition inside the cultivation greenhouse.

Comparing the cases of with and without electron radiation, the results of the verification test 1 are shown in the following Table 1. The amount of yield increased by 50% in weight ratio. The average sugar content improved by 40%. The incidence rate of non-standard products such as immaturity decreased from 25% to 3%. The incidence rate of bacterial wilt due to replant failures decreased from 30-50% to 3%. The incidence rate of other plant diseases (diseases caused by viruses, bacteria, etc.) decreased from 30% to 10%. With this verification test, even in the case of safe electric environment to workers with high voltage and fine current, it was confirmed that the amount of yield of tomatoes increased, the quality improved, and plant growth could be effectively accelerated only by electron radiation.

TABLE 1

|  | w/o electron radiation | w/ electron radiation | Percentage change |
|---|---|---|---|
| Yield amount (t) | 10t | 15t | +50% |
| Avg. sugar content (%) | 6% | 8.5% | +40% |
| Non-standard rate (%) | 25% | 3% | −88% |
| Replant failure rate (%) | 30-50% | 3% | −90% |
| Other disease rate (%) | 30% | 10% | −65% |

(Verification Test 2)

In the verification test 2, using the electron radiation means 40 and the electron generation means 10, a verification test to accelerate growth of pumpkins of fruit vegetable category in a plant growth area of approx. 50 m in length, approx. 20 m in width and area of approx. 1000 m2 was conducted. In the verification test 2, the cases of with and without electron radiation were compared in the same planting condition of 1000 pumpkin plants. The detailed test condition and test results are explained as follows.

Here, the cultivation method of pumpkins in this verification test will be briefly explained. In general, pumpkins extend two secondary vines from a main vine and bear a pair of fruits on the each secondary vine. However, the test cooperation farm cultivated pumpkins that conformed to qualified standards for high quality prescribed in the region by bearing one fruit on each secondary vine. The requirements to meet the high-quality qualified standards are weight of a pumpkin being within 800-900 g, cavities appeared in flesh cutting section being rare, and high flesh density.

Then, in the verification test 2, the verification test was conducted on whether pumpkins conforming to the high-quality qualified standards could be produced, even if bearing two fruits on each secondary vine. The plant growth areas for the verification test were two locations in the same region and the same season, in one location electrons were radiated and in the other location electrons were not radiated, and pumpkins were cultivated and compared. The area of each location was the same approx. 1000 m2.

(Testing Environment)

The plant growth area of the verification test was a cultivation greenhouse situated at lat. 31.5° N., long. 131.0° E. and at an altitude of 150 m. The test period was 20 days from Feb. 15, 2016 to Mar. 5, 2016. The average temperature outside of the greenhouse during the test period was 7.6° C. (maximum temperature: 21.2° C., minimum temperature: −3.0° C.) The precipitation outside of the greenhouse during the test period was 69.0 mm (days of precipitation: 4 days). Inside of the greenhouse, the temperature was controlled by heating equipment within the range of 10-15° C. during night and 20-25° C. in daytime.

(Specification of Testing Equipment)

The power consumption of the testing equipment was 2 W, and used power supply was commercial AC power supply of 200V, 60 Hz. The voltage value of the primary-side AC power was 200V, and the current value was 10 mA. The ratio of winding number between the primary coil and the secondary coil was set at 25 times, and the voltage value of AC power on the secondary side became 5000V and the current value became 0.4 mA. With continuously energizing for the full testing period, total amount of used power was 2 W×24 h×20 days=0.96 kWh. When 1 kWh costs ¥20, electric charge was approx. ¥20 in total.

The environment, in which electrons were radiated from the electron radiation parts 43, was the same as in the verification test 1. The results of the verification test 2 are shown in the following Table 2 comparing the cases of with and without electron radiation. As for the amount of yield, the number of yield increased by 70%, since no thinning out was done. The conforming rate to the qualified standards improved from 70% to 97%. The cavity incidence rate in flesh cutting section decreased from 15% to 3%. The incidence rate of non-standard products caused by immaturity, etc. decreased from 20% to 4%. The incidence rate of bacterial wilt due to replant failures decreased from 20% to 3%. The wilt incidence rate decreased from 20% to 5%.

TABLE 2

|  | w/o electron radiation | w/ electron radiation | Percentage change |
|---|---|---|---|
| Yield number (pc.) | 2,000 pc. | 3,500 pc. | +70% |
| Std. conforming rate (%) | 70% | 97% | +40% |
| Cavity rate (%) | 15% | 3% | −80% |
| Non-standard rate (%) | 20% | 4% | −80% |
| Replant failure rate (%) | 20% | 3% | −85% |
| Wilt rate (%) | 20% | 5% | −75% |

Here, in the case of without electron radiation, the number of yield decreased in great extent, since thinning out is necessary, also weight of the pumpkins varied in the range of 600 g-1200 g, and it took time to select pumpkins that conformed to the high-quality qualified standards.

From the results obtained by the verification test 1 and verification test 2, according to the present invention, firstly, increase of yield amount and quality improvement were verified in plural kinds of fruit vegetable category in the wide plant growth area not electrically insulated from the earth. Furthermore, since leaf vegetables and root vegetables are cultivated in similar plant growth environment as fruit vegetables, plant growth can be accelerated effectively, not being limited to fruit vegetables, by generating electrons with small electric power by the plant growth acceleration system of the present invention.

Meanwhile, different from growth of plant itself, tests were also conducted from the viewpoints of improvement of soil environment. The results of two analytical tests are as follows.

(Analytical Test 1)

In the analytical test 1 (tests were conducted at Japan Food Research Laboratories in 2014), variation in population of bacteria by radiating electrons to the soil was analyzed. The testing equipment was the same equipment of the verification test 1. In the analytical test, collecting soil of total 20 kg and dividing 10 kg each, then after radiating electrons to one side for 245 hours, the variation in population of bacteria was analyzed. The analysis subjects were colon bacilli and aerobic bacteria in the soil per 1 g.

(Analytical Test 2)

In the analytical test 2 (tests were conducted at Miyazaki Agricultural Extension Center in 2013), the variation of EC value in the soil of the plant growth area, in which the verification test 1 was conducted, was analyzed. The testing equipment was the same equipment of the verification test 1. The results of the analytical test 1 and the analytical test 2 are shown in the following Table 3 collectively.

TABLE 3

|  | w/o electron radiation | w/ electron radiation | Percentage change |
|---|---|---|---|
| Aerobic bacteria (pc.) | $8.0 \times 10^7$ | $8.8 \times 10^7$ | +10% |
| Colon bacilli (pc.) | 9,300 | 2,300 | −70% |
| EC value (mS/cm) | 0.21 | 0.46 | +120% |

Comparing the cases of with and without electron radiation, the effect was compared from the analytical results shown in Table 3. In the case of with electron radiation, the number of aerobic bacteria that accelerate plant growth increased by 10%, and the number of colon bacilli that inhibit plant growth decreased by 70%. The EC value representing nitrate nitrogen concentration improved 2.2 times from 0.21 to 0.46. Here, the reason of increasing the nitrate nitrogen concentration was presumed that the increase of aerobic bacteria number accelerated fermentation of fertilizer scattered on the soil. It was measured that the soil temperature slightly increased according to the fermentation of fertilizer.

Inside the soil with electron radiation, bacteria to accelerate plant growth increased, bacteria to inhibit plant growth decreased, and nitrate nitrogen concentration contained in nitrogen fertilizer rose, thus it was presumed to be able to accelerate the growth of various kinds of plant, not limited to fruit vegetables.

Example 2

Figure 3A:
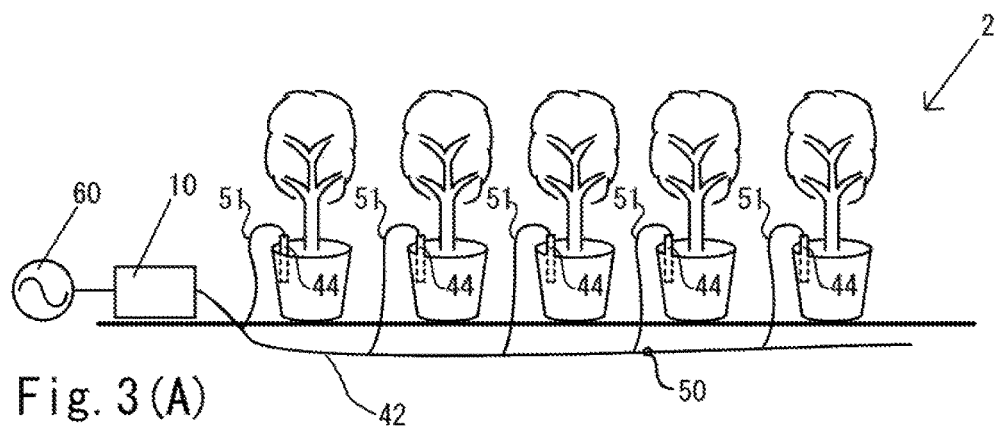
FIG. 3(A), FIG. 3(B) and FIG. 3(C) are explanatory drawings to explain the plant growth acceleration system (Example 2).
Figure 3B:
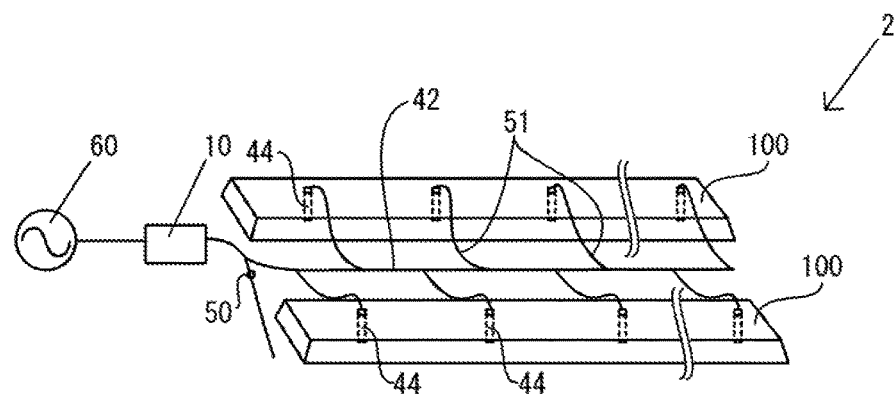
Figure 3C:
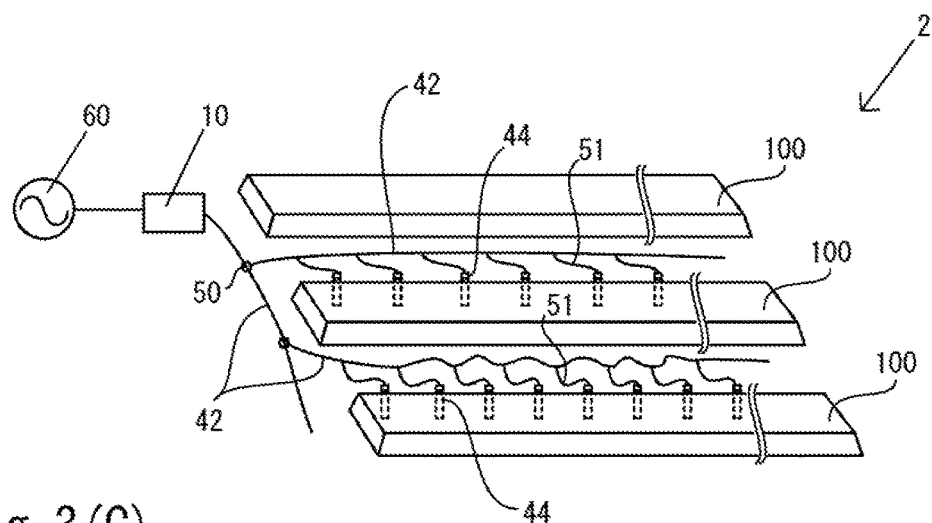

In the example 2, the example with different configuration of wiring of electron transmission parts will be explained, referring to FIG. 3(A), FIG. 3(B) and FIG. 3(C). In the plant growth acceleration system 2, the electron transmission parts 42 are branched at plural locations, extend branched parts 51 of the electron transmission parts from the branched locations, and install bar-shaped electron radiation parts 44 on the tips. FIG. 3(A) shows an example applied to plural planters. FIG. 3(B) and FIG. 3(C) show examples applied to a wide plant growth area, specifically farms. As for others than the structure of the electron radiation means, explanations are omitted due to the similarity with the example 1. Incidentally, the plural planters are in an electrically grounded state respectively.

The electron radiation means includes the linearly long-extended electron transmission parts 42 and the electron radiation parts 44. The electron transmission parts 42 are wire with insulation covering, branched at plural locations, and equipped with the branched parts 51. The branched parts 51 are also with insulation covering. On the tips of branched parts 51, the electron radiation parts 44 of a metal bar are attached. The electron transmission parts 42 are separable and also connectable at connecting parts 50.

Referring to FIG. 3(A), the example applied to a small-scale plant growth area is explained. For instance, in the case of applying to cultivation in kitchen gardens or of foliage plants, etc., insertion of the electric radiation parts 44 by one piece per each planter is sufficient (refer to FIG. 3(A)). Even in such cases as planting is already completed in planters or as digging soil is difficult, for example, in the case of tree vigor recovery in a store or a lease store of foliage plants, the plant growth acceleration system 2 can be easily introduced.

Next, referring to FIG. 3(B) and FIG. 3(C), the examples applied to a large-scale plant growth area, for example a farm, are explained. In these cases, the electron radiation parts 44 are only inserted with a space between each other into furrows of a farm. The layout of the electron radiation parts can be appropriately selected depending on the planting layout, the introduction timing of the plant growth acceleration system, and the necessary amount of electron radiation corresponding to the kind of plant.

In FIG. 3(B), while placing carelessly the electron transmission parts 42 between the furrow 100 and the furrow 100 and extending the branched parts 51 alternatingly to the furrows on both sides, the electron radiation parts 44 are inserted to the furrows on both sides (refer to FIG. 3(B)). In the center furrow shown in FIG. 3(C), the branched parts 51 extend only to the center furrow from the electron transmission parts 42 placed between the furrows, and insert the electron radiation parts 44. Compared with the case of FIG. 3(B), since the space of the electron radiation parts 44 is a half, the amount of electron radiation increases.

Also, if the larger amount of radiated electrons is necessary according to the kind of plant or soil property, making the space between the inserted electron radiation parts 44 smaller by slacking the electron transmission parts 42 is enough (refer to the lowest furrow in FIG. 3(C)). In the early stage of introduction of the plant growth acceleration system, until the appropriate amount of electrons radiated to the plant growth area is recognized, it is better to adjust appropriately the space between the inserted electron radiation parts 44 by observing growing state of the plants.

Example 3

Figure 4A:
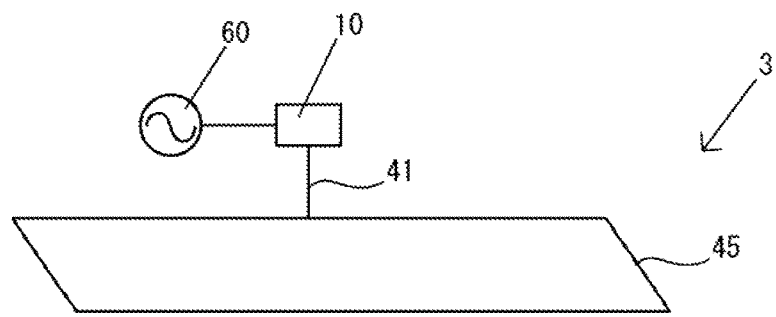
FIG. 4(A), FIG. 4(B) and FIG. 4(C) are explanatory drawings to explain a modified example of the electron radiation means (Example 3).
Figure 4B:
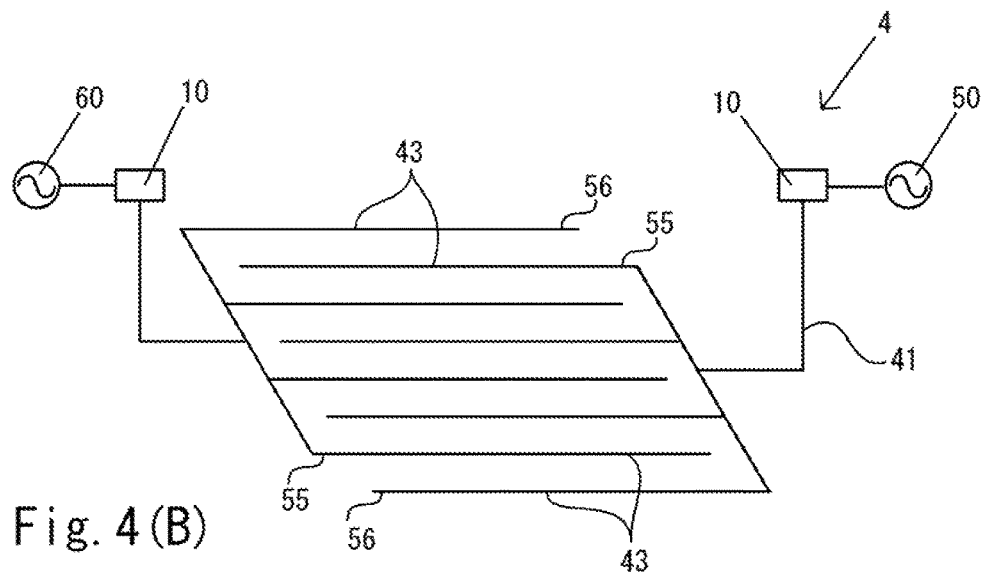
Figure 4C:
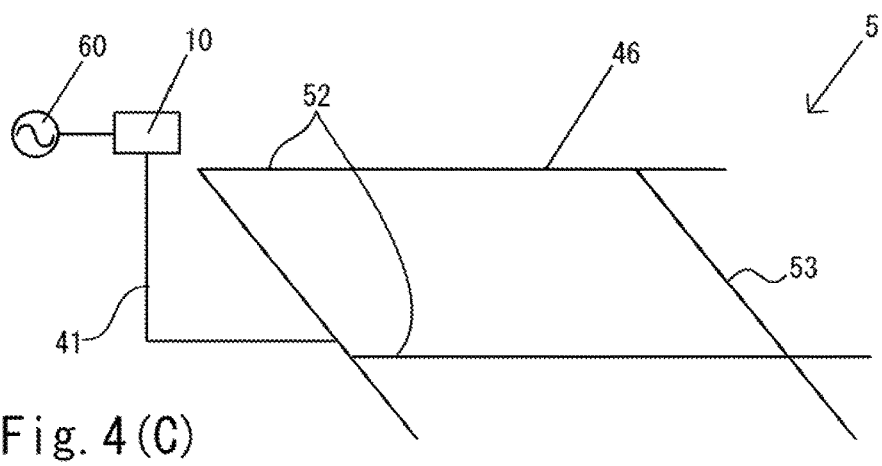

In the example 3, the example that is different mainly in the configuration of wiring of electron radiation parts is briefly explained referring to FIG. 4(A), FIG. 4(B) and FIG. 4(C). The plant growth acceleration system 3 wires the electron radiation parts 45 in a loop shape (refer to FIG. 4(A)). The plant growth acceleration system 4 equips the plural electron generation means 10, and radiates electrons to the opposite direction (refer to FIG. 4(B)). The plant growth acceleration system 5 wires the electron radiation parts 46 in a net shape (refer to FIG. 4(C)). In these examples, since the structure other than wiring configuration of the electron radiation parts and the number of placed electron generation means is similar as in example 1, explanations for the electron generation means are omitted.

In the plant growth acceleration system 3, the electron radiation part 45 extended from the electron transmission part 41 is in a loop shape. With this, at any location within the range surrounded by the electron radiation part 45, an amount of electron radiation is not susceptible to deviation (refer to FIG. 4(A)). In the plant growth acceleration system 4, a plurality of the electron generation means 10, 10 shown in the example 1 are placed on both sides of the plant growth area, and the electron radiation parts 43, 43 extended from each of the electron transmission parts 41 are grounded alternatingly.

When the length of the electron radiation parts 43 becomes long, electrons are attenuated due to own resistance of the electron radiation parts, thus an amount of electron radiation at tip portions 56 decreases relatively from base portions 55. Then, deviation occurs in an amount of electron radiation depending on the distance from the electron generation means 10. According to the plant growth acceleration system 4, the electron radiation parts 43, 43 extend linearly alternatingly toward the facing electron generation means 10 from each of the electron generation means 10 placed on both sides of the plant growth area. By arranging the tip portions 56 of the electron radiation parts with small amount of electron radiation and the base portions 55 with large amount of electron radiation alternatingly, electrons can be radiated evenly to the plant growth area without deviation of an amount of electron radiation.

The plant growth acceleration system 5 connects the second electron transmission parts 53 to the branched electron transmission parts 52 in a crossing direction. With this, the electron radiation parts 46 are arranged in a net shape as a whole, and electrons can be radiated evenly to the wide plant growth area surrounded by the electron radiation parts 46 arranged in a net shape. Thus, even in a wide plant growth area such as pasture or orchards, plants can be cultivated by radiating electrons effectively.

Example 4

Figure 5A:
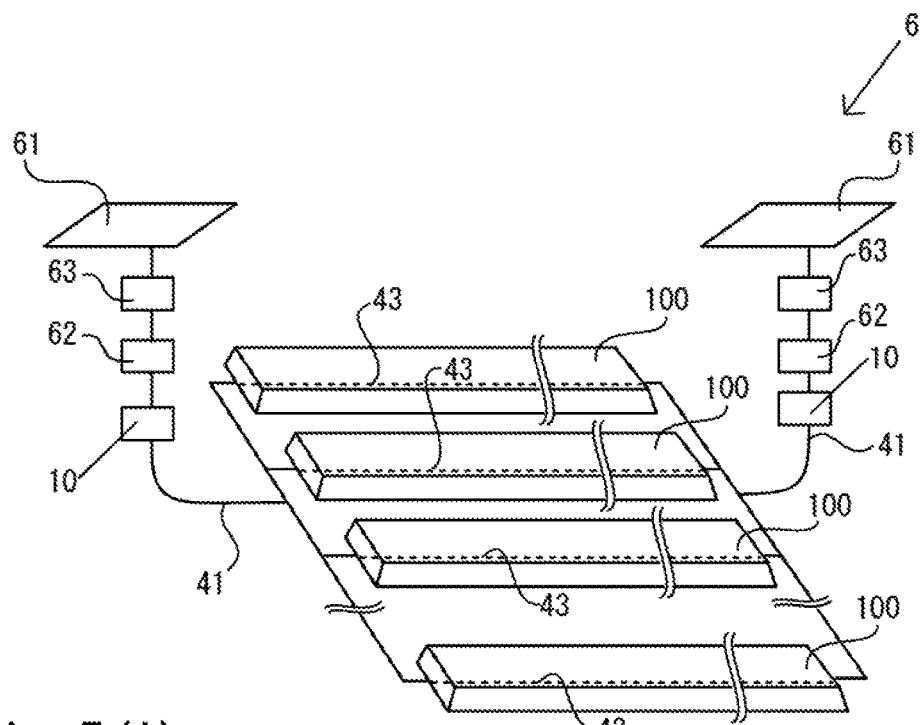
FIG. 5(A) and FIG. 5(B) are explanatory drawings to explain the plant growth acceleration system that includes a solar power generation apparatus (Example 4).
Figure 5B:
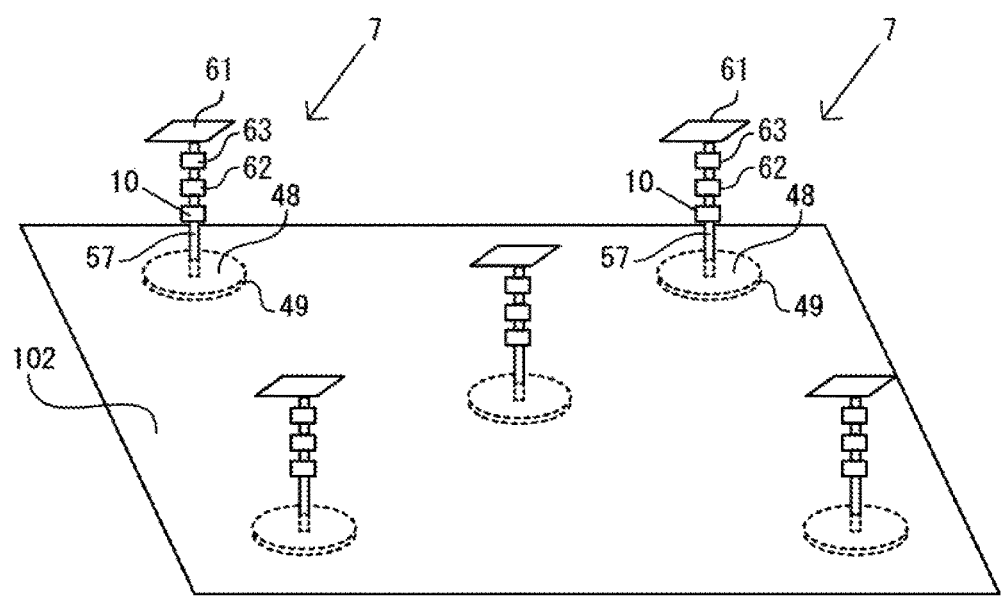

In the example 4, two examples of plant growth acceleration system that include the solar power generation apparatus 61 and the inverter circuit 62 are explained referring to FIG. 5. The plant growth acceleration system 6 that radiates electrons to a plant growth area from the electron radiation parts 43 linearly long-extended is explained referring to FIG. 5(A). Also, the plant growth acceleration system 7 independent from commercial power supply is explained referring to FIG. 5(B). Here, FIG. 5(A) shows the example of a plant growth area being a farm, and FIG. 5(B) shows the example of a plant growth area being a paddy field.

The plant growth acceleration system 6 is composed of the solar power generation apparatus 61, the inverter circuits 62, the electrical storage devices 63, the electron generation means 10, the electron transmission parts 41 and the linearly extending electron radiation parts 43. DC power generated by the solar power generation apparatus 61 is converted by the inverter circuit 62 to AC power, which is supplied to the primary circuit in the transformation circuit.

Also, excess power generated by the solar power generation apparatus is stored in the electrical storage device 63, thus continuously radiating electrons even during night becomes possible. Again, if the AC power supply converted by the inverter circuit equalizes to the voltage value and the frequency of commercial power supply, it is favorable, since commercial power supply can be simultaneously utilized without adding alteration to the circuit of the electron generation means.

Next, the plant growth acceleration system 7 composed of electron radiation parts made of conductive wire is explained referring to FIG. 5(B). The plant growth acceleration system 7 is composed of the solar power generation apparatus 61, the electrical storage device 63, the inverter circuit 62, the electron generation means 10, the electron transmission part 48, and the electron radiation part that forms a ring on the outer edge 49. The plural plant growth acceleration systems 7 are installed independently from commercial power supply in the paddy field 102. Since there is no wiring between each plant growth acceleration system 7, large-scale farming can be easily carried out by running large farming machines. As a large-scale plant growth area, orchards, etc., where roots of trees are prone to spread around, are ideal other than paddy fields, farms, pasture, etc. Although the drawing is omitted, by employing a disc-shaped conductor as the electron radiation parts, the outer edge of the same can be electron radiation parts.

Example 5

Figure 6A:
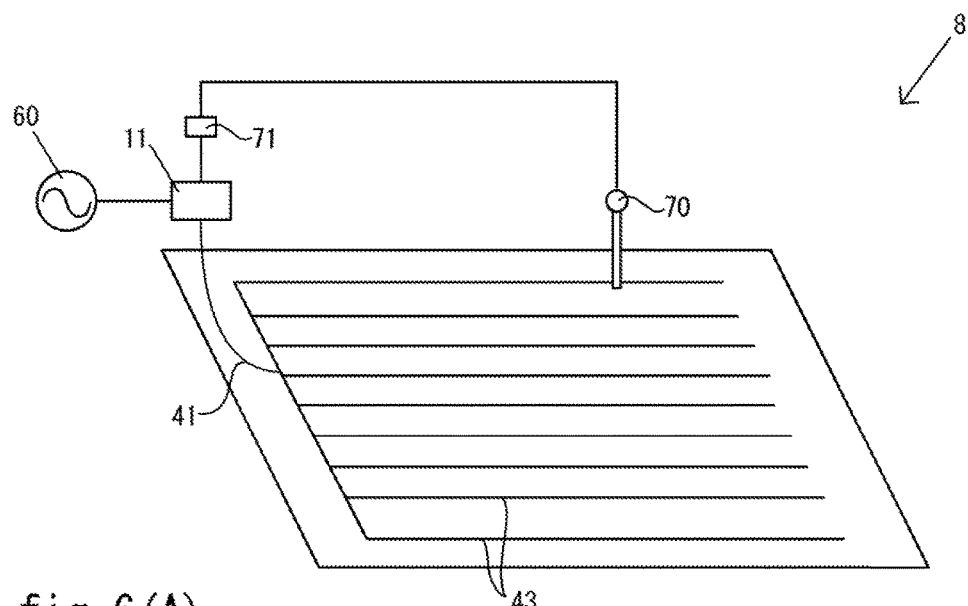
FIG. 6(A) and FIG. 6(B) are explanatory drawings to explain the plant growth acceleration system that can regulate the amount of electron radiation (Example 5).
Figure 6B:
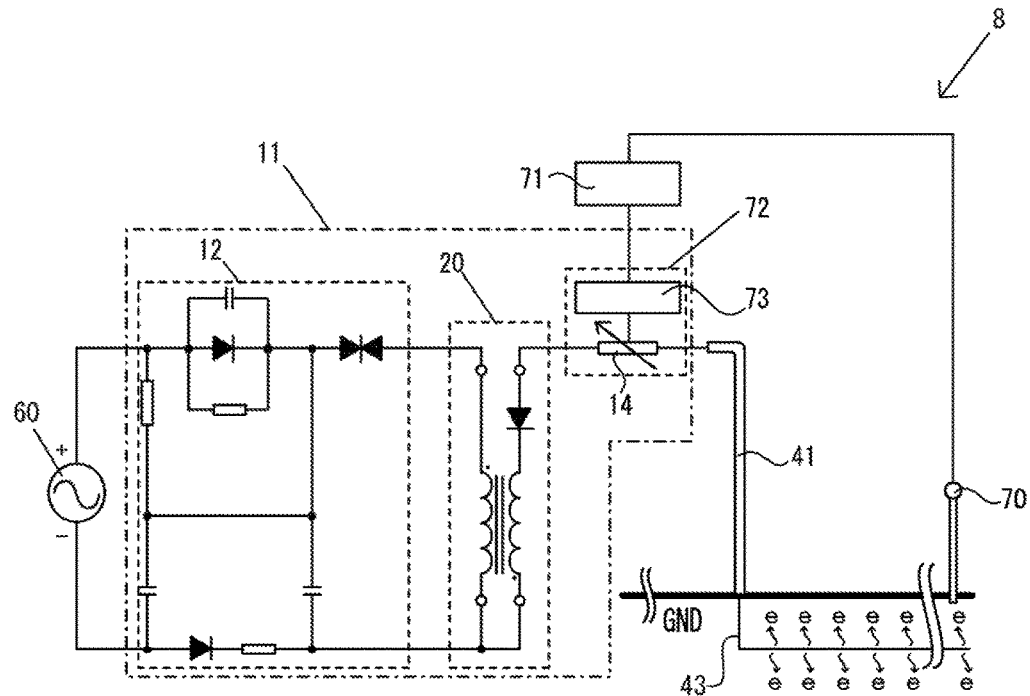

In the example 5, the plant growth acceleration system 8 that enables to regulate an amount of electron radiation according to the soil condition is explained referring to FIG. 6(A) and FIG. 6(B). FIG. 6(A) shows the whole plant growth acceleration system, FIG. 6(B) shows the structure of electric circuit of the plant acceleration system. In the each drawing of FIG. 6(A) and FIG. 6(B), the electric wiring that activates the soil condition detection means is omitted for easier understanding.

The plant growth acceleration system 8 is composed of the soil condition detection means 70, the memory means 71, the electron generation means 11, the electron transmission parts 41 and the electron radiation parts 43 (refer to FIG. 6(A)). The electron radiation regulation means 72 is united with the electron generation means (refer to FIG. 6(B)). The soil condition detection means 70 has EC value measuring device that detects EC value of the plant growth area and temperature measuring device that detects soil temperature. For the EC value measuring device and the temperature measuring device, known devices can be used.

In the memory means 71, the range of presumed value of soil condition suitable to the cultivating plant and the soil is pre-stored, and the value of soil condition detected by the soil condition detection means and the amount of electron radiation are also stored. In the range of presumed value of soil condition, the appropriate value of soil condition according to a kind of plants, outside temperature, seasons, soil property, etc. and the amount of electron radiation that realizes the appropriate value of soil condition are stored.

The electron radiation regulation means 72 has the current controlling resistance 14 that can change resistance value by transmissions of electric signal, and the electric signal controlling parts 73 that control electric signals according to the detected value of soil condition. Supply amount of electrons is proportional to a current value if a voltage value is constant. Therefore, if the resistance value of the current controlling resistance 14 is increased or decreased while the voltage value being kept constant, the current value increases or decreases likewise, and it is possible to increase or decrease the amount of electron radiation radiated from the electron radiation parts 43.

More specifically, comparing the value of soil condition with the presumed value of soil condition in the electric signal controlling parts 73, in the case that the value of soil condition is higher than the presumed value of soil condition, the amount of electron radiation to the plant growth area shall be lowered by transmitting electric signal to relatively increase the resistance value of the current controlling resistance 14. If the amount of electron radiation is lowered, according to that, the EC value or the soil temperature will converge within the presumed value of soil condition over time.

On the other hand, in the case that the value of soil condition is lower than the presumed value of soil condition, the amount of electron radiation shall be increased by relatively lowering the resistance value of the current controlling resistance 14. By the function of the electron radiation regulation means 72, the amount of electron radiation shall be maintained so that the EC value and the soil temperature fall within the presumed value of soil condition. Also, if the value of soil condition recorded for the period of a good harvest in the plant growth area is renewed as the presumed value of soil condition, reproducing condition with the value of soil condition for the period of a good harvest can become easy.

(Others)

The embodiments disclosed here are illustrative examples in all respects, and it should be considered that the embodiments are not restrictive. The technical scope of the present invention is shown by claims without being restricted to the above explanation, and all modifications are intended to be included in the same meaning and range as the claims.

REFERENCE SIGNS LIST 1, 2, 3, 4, 5, 6, 7, 8 . . . plant growth acceleration system
10, 11 . . . electron generation means, 12 . . . protection circuit,
13, 14 . . . current controlling resistance,
20 . . . transformer circuit, 21 . . . primary circuit,
22 . . . primary coil, 23 . . . first terminal of primary circuit,
24 . . . second terminal of primary circuit,
31 . . . secondary circuit, 32 . . . secondary coil,
33 . . . first terminal of secondary circuit,
34 . . . second terminal of secondary circuit,
35 . . . connecting point, 36 . . . diode,
40 . . . electron radiation means,
41, 42, 47 . . . electron transmission part,
43, 44, 45, 46, 48 . . . electron radiation part, 49 . . . outer edge,
50 . . . connecting part, 51 . . . branched part,
52 . . . branched electron transmission part,
53 . . . second electron transmission part,
54 . . . insulation covering, 55 . . . base portion,
56 . . . tip portion, 60 . . . power supply,
61 . . . solar power generation apparatus, 62 . . . inverter circuit,
63 . . . electrical storage device,
70 . . . soil condition detection means, 71 . . . memory means,
72 . . . electron radiation regulation means,
73 . . . electric signal controlling parts,
100 . . . furrow, 102 . . . paddy field

The invention claimed is:

1. A plant growth acceleration system is composed of an electron generation means that generates electrons and an electron radiation means that radiates electrons to a plant growth area, and the plant growth acceleration system is characterized as follows:
the plant growth area is in an electrically grounded condition;
the electron generation means has a transformer circuit that transforms AC power inputted to a primary circuit to high voltage and outputs from a secondary circuit; a first terminal of the secondary circuit is connected to the primary circuit, and a second terminal of the secondary circuit is connected to the electron radiation means; according to plus/minus inversion cycles of the AC power, in the state of the first terminal being in positive potential current from the second terminal to the electron radiation means is blocked, and in the state of the first terminal being in negative potential the current returns from the first terminal to the primary circuit; thus
only in the state of the first terminal being in negative potential, according to the inversion cycles, the electrons are transmitted cyclically from the second terminal to the electron radiation means;
the electron radiation means includes electron transmission parts that have electron radiation parts grounded to the plant growth area;
the electron transmission parts extend linearly;
the electron radiation parts extend linearly and are continuously grounded to the plant growth area; and
the electron radiation parts radiate only the electrons along the electron radiation parts, and accelerate plant growth.

2. The plant growth acceleration system according to claim 1, wherein
the electron transmission parts are dividable in an extending direction;
connection and disconnection devices are equipped on each divided electron transmission part;
the connection device enables to connect each of the divided electron transmission parts so that the electrons are transmitted; and
the disconnection device enables to disconnect each of the divided electron radiation parts, when a disconnecting operation is carried out.

3. The plant growth acceleration system according to claim 2, wherein the electron transmission parts are branched to a plurality and the branched electron transmission parts are arranged in parallel to each other.

4. The plant growth acceleration system according to claim 2, wherein a plurality of the electron generation means are included and are connected respectively to remote locations of the electron transmission parts.

5. The plant growth acceleration system according to claim 1, wherein the electron transmission parts are branched to a plurality and the branched electron transmission parts are arranged in parallel to each other.

6. The plant growth acceleration system according to claim 5, wherein
second electron transmission parts extend linearly so as to intercross the branched electron transmission parts; and
the branched electron transmission parts and the second electron transmission parts are in the state to transmit the electrons.

7. The plant growth acceleration system according to claim 1, wherein a plurality of the electron generation means are included and are connected respectively to remote locations of the electron transmission parts.

8. The plant growth acceleration system according to claim 1, wherein
a solar power generation apparatus and power transformation means are included;
DC power is generated by the solar power generation apparatus; and
the DC power is transformed by the power transformation means to AC power, which becomes AC power supplied to the primary circuit.

9. The plant growth acceleration system according to claim 8, wherein
the plant growth acceleration system includes a soil condition detection means, memory means, and electron radiation regulation means;
the soil condition detection means detects a value of soil condition of at least either EC value of the plant growth area or soil temperature;
the memory means stores the value of the soil condition and the amount of electron radiation, and also pre-stores a range of presumed value of soil condition suitable for cultivating plants; and
the amount of electron radiation from the electron radiation parts can be regulated by the electron radiation regulation means so that the value of soil condition falls within the range of presumed value of the soil condition.

10. The plant growth acceleration system according to claim 1, wherein
the plant growth acceleration system includes a soil condition detection means, memory means, and electron radiation regulation means;

the soil condition detection means detects a value of soil condition of at least either EC value of the plant growth area or soil temperature;

the memory means stores the value of the soil condition and the amount of electron radiation, and also pre-stores a range of presumed value of soil condition suitable for cultivating plants; and the amount of electron radiation from the electron radiation parts can be regulated by the electron radiation regulation means so that the value of soil condition falls within the range of presumed value of the soil condition.

11. A plant growth acceleration system is composed of an electron generation means that generates electrons and an electron radiation means that radiates electrons to a plant growth area, and the plant growth acceleration system is characterized as follows:

the plant growth area is in an electrically grounded condition;

the electron generation means has a transformer circuit that transforms AC power inputted to a primary circuit to high voltage and outputs from a secondary circuit; a first terminal of the secondary circuit is connected to the primary circuit, and a second terminal of the secondary circuit is connected to the electron radiation means; according to plus/minus inversion cycles of the AC power, in the state of the first terminal being in positive potential current from the second terminal to the electron radiation means is blocked, and in the state of the first terminal being in negative potential the current returns from the first terminal to the primary circuit; thus only in the state of the first terminal being in negative potential, according to the inversion cycles, the electrons are transmitted cyclically from the second terminal to the electron radiation means;

the electron radiation means includes electron transmission parts that have electron radiation parts grounded to the plant growth area;

the electron transmission parts extend linearly;

the electron radiation parts are distributedly attached to plural places of the electron transmission parts and grounded to the plant growth area; and the electron radiation parts radiate only the electrons distributedly from the electron radiation parts, and accelerate plant growth.

12. The plant growth acceleration system according to claim 11, wherein the electron transmission parts are dividable in an extending direction;

connection and disconnection devices are equipped on each divided electron transmission part;

the connection device enables to connect each of the divided electron transmission parts so that the electrons are transmitted; and the disconnection device enables to disconnect each of the divided electron radiation parts, when a disconnecting operation is carried out.

13. The plant growth acceleration system according to claim 12, wherein the electron transmission parts are branched to a plurality and the branched electron transmission parts are arranged in parallel to each other.

14. The plant growth acceleration system according to claim 12, wherein a plurality of the electron generation means are included and are connected respectively to remote locations of the electron transmission parts.

15. The plant growth acceleration system according to claim 11, wherein the electron transmission parts are branched to a plurality and the branched electron transmission parts are arranged in parallel to each other.

16. The plant growth acceleration system according to claim 11, wherein a plurality of the electron generation means are included and are connected respectively to remote locations of the electron transmission parts.

17. The plant growth acceleration system according to claim 11, wherein a solar power generation apparatus and power transformation means are included;

DC power is generated by the solar power generation apparatus; and the DC power is transformed by the power transformation means to AC power, which becomes AC power supplied to the primary circuit.

18. The plant growth acceleration system according to claim 11, wherein the plant growth acceleration system includes a soil condition detection means, memory means, and electron radiation regulation means;

the soil condition detection means detects a value of soil condition of at least either EC value of the plant growth area or soil temperature;

the memory means stores the value of the soil condition and the amount of electron radiation, and also pre-stores a range of presumed value of soil condition suitable for cultivating plants; and the amount of electron radiation from the electron radiation parts can be regulated by the electron radiation regulation means so that the value of soil condition falls within the range of presumed value of the soil condition.

19. A plant growth acceleration system is composed of an electron generation means that generates electrons, an electron radiation means that radiates electrons to a plant growth area, a solar power generation apparatus, and a power transformation means, and the plant growth acceleration system is characterized as follows:

the plant growth area is in an electrically grounded condition;

the electron generation means has a transformer circuit that transforms AC power inputted to a primary circuit to high voltage and outputs from a secondary circuit; a first terminal of the secondary circuit is connected to the primary circuit, and a second terminal of the secondary circuit is connected to the electron radiation means; according to plus/minus inversion cycles of the AC power, in the state of the first terminal being in positive potential current from the second terminal to the electron radiation means is blocked, and in the state of the first terminal being in negative potential the current returns from the first terminal to the primary circuit; thus only in the state of the first terminal being in negative potential, according to the inversion cycles, the electrons are transmitted cyclically from the second terminal to the electron radiation means;

the solar power generation apparatus generates DC power;

only AC power, which is transformed from the DC power by the power transformation means, is inputted to the primary circuit;

the electron radiation means includes electron radiation parts grounded to the plant growth area; and an outer edge of the electron radiation parts forms a ring shape, radiates the electrons in a ring shape around the places where the electron radiation parts are grounded, and accelerates growth of the plant.

20. The plant growth acceleration system according to claim 19, wherein the plant growth acceleration system includes a soil condition detection means, memory means, and electron radiation regulation means;

the soil condition detection means detects a value of soil condition of at least either EC value of the plant growth area or soil temperature;

the memory means stores the value of the soil condition and the amount of electron radiation, and also pre-stores a range of presumed value of soil condition suitable for cultivating plants; and the amount of electron radiation from the electron radiation parts can be regulated by the electron radiation regulation means so that the value of soil condition falls within the range of presumed value of the soil condition.

* * * * *